Patented May 29, 1928.

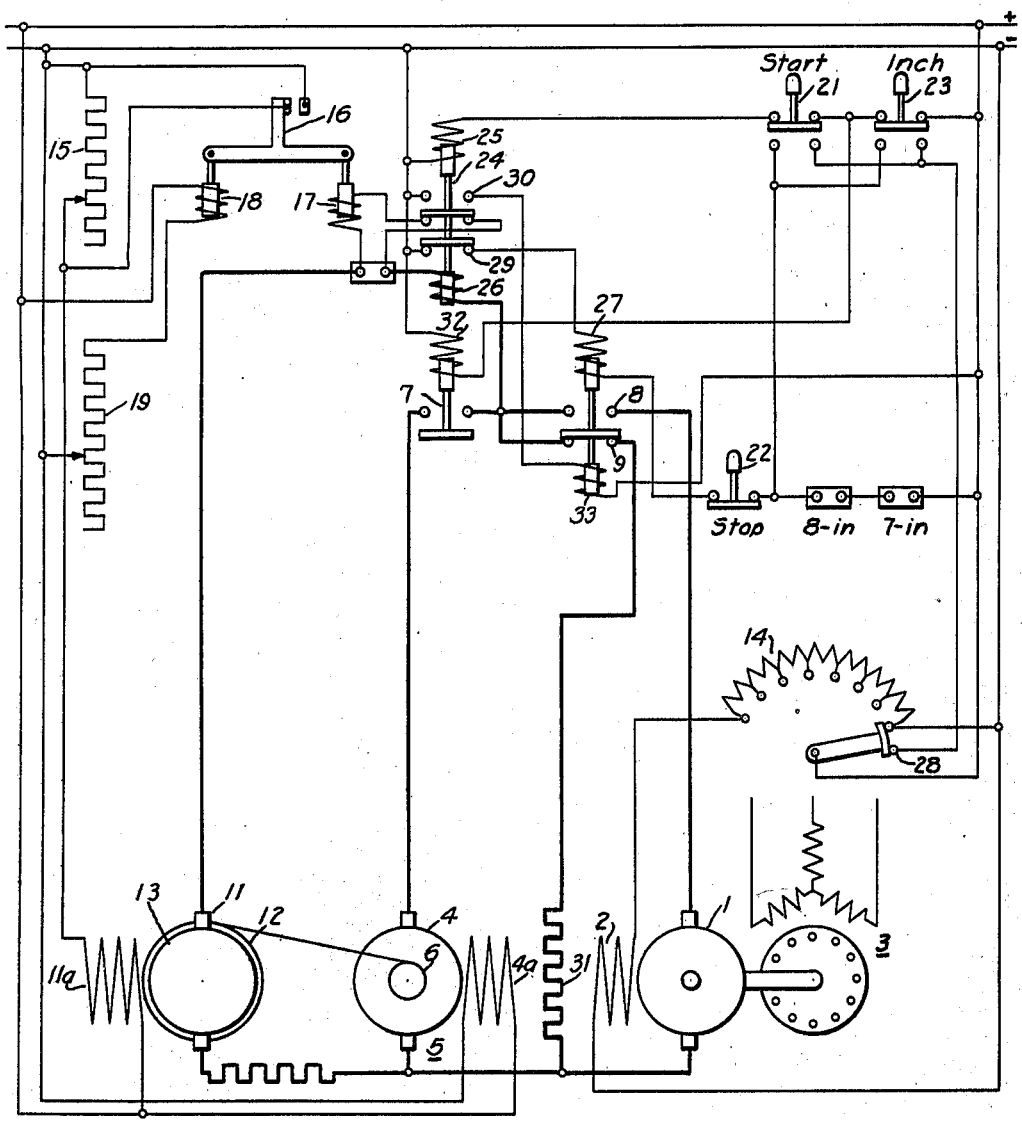

1,671,529

UNITED STATES PATENT OFFICE.

REESE T. KINTZING AND OSCAR C. CORDES, OF WILKINSBURG, PENNSYLVANIA, ASSIGNORS TO WESTINGHOUSE ELECTRIC & MANUFACTURING COMPANY, A CORPORATION OF PENNSYLVANIA.

MOTOR-CONTROL SYSTEM.

Application filed July 24, 1925. Serial No. 45,755.

Our invention relates to systems of motor control and more particularly to systems employed in connection with machines for the winding of material in rolls.

An object of our invention is to maintain suitable tension in the material that is being unwound from one reel and rewound on another reel.

Another object of our invention is to quickly interrupt both the unwinding and the rewinding operations in the event of failure to maintain suitable tension or if the material is torn apart.

Other objects of our invention will become apparent from the following description of the operation of the system.

Our invention is particularly adapted to the winding of paper or other fragile material. As is well understood, paper for printing purposes, for example, is commonly wound on a large roll, from which, before use, it must be cut and rewound on other rolls in order to have dimensions suitable for newspaper presses or the like.

In accordance with our invention, a motor for operating the winding reel, hereafter termed the winder motor, is supplied with energy from a source of variable voltage, preferably comprising a motor-generator set. An auxiliary generator is connected to the supply roll from which the paper is unwound and the generator armature is connected, through certain switching apparatus, in parallel relation to the winder motor. By varying the field excitation of this auxiliary or "brake" generator, the generator will act as a "drag" to maintain tension in the paper. When the machines are first started and the paper is being threaded into the winding reel or roll, the auxiliary generator operates as a motor to assist in the threading operation. During normal operation, in the event of failure to maintain tension or if the paper breaks, dynamic braking is automatically applied to the winder motor and to the "brake" generator to promptly stop the several operations.

Our invention will be best understood by reference to the accompanying drawing, in which:

Fig. 1 is a diagrammatic view of circuits and apparatus embodying our invention, and Fig. 2 is a chart indicating the sequence of operation of the main switches employed in the system.

With reference to the drawing, we provide a motor-generator set comprising a direct-current generator, which is provided with an armature 1 and a separately excited field-magnet winding 2, and is driven by any suitable means, such as the illustrated alternating-current motor 3. The armature 4 of a winder motor 5 for operating a reel or roll 6 is connected in a loop or closed circuit with the generator armature 1 through a plurality of electromagnetically operable switches 7 and 8. The winder motor 5 is also provided with a separately-excited field winding 4a. One of the switches 7 and 8 is provided with "back-contact" members 9 for establishing a dynamic braking circuit for the winder motor, as hereinafter set forth.

An auxiliary or "brake" generator 11 is preferably directly connected to a supply roll 12 and is provided with a separately excited field winding 11a. The generator armature 13 is connected in parallel relation to the armature 4 of the winder motor. Suitable field rheostats 14 and 15, respectively, control the main and auxiliary generators and additional means comprising a current regulator 16 is adapted to further control the excitation of the brake generator by intermittently short-circuiting the rheostat 15.

This regulator is provided with a current coil 17, which is responsive to current traversing the armature 13 of the brake generator, and with a voltage coil 18 for opposing the operation of the current coil. The effect of the voltage coil may be adjusted by means of a rheostat 19, which is connected in circuit therewith and is effective to vary the setting of the current regulator and so vary or adjust the tension in the paper, as hereinafter more fully set forth.

In accordance with known practice, we have provided "push-buttons" or switches 21, 22 and 23 that are adapted to the starting, stopping, and inching operations. The illustrated electromagnetic switches are controlled through a transfer relay 24 having a shunt operating coil 25 and also a series coil 26, for maintaining the relay in its illustrated lower position when load current traverses the brake generator circuit.

Assuming the apparatus to be in its illustrated and inoperative condition, and that the motor-generator set is operating at normal speed, the winding operation is commenced by depressing the starting button 21 to establish a circuit for the operating coil 27 of the line contactor 8 that extends from the positive line conductor through an auxiliary button 28 on the generator field rheostat 14, the lower contact members of start button 21, stop button 22, operating coil 27 of the line switch and the lower contact members 29 of the transfer relay 24 to the negative line conductor.

The purpose of the auxiliary button 28 on the generator field-rheostat is to insure that the rheostat is initially in the weak-field position, otherwise the starting button is not effective. It should be noted that upon depressing the start button 21, the circuit for the shunt operating coil 25 of transfer relay 24 is interrupted; therefore, said relay will be maintained in its lower or illustrated position. A holding circuit for the operating coil 27 of the line switch 8 extends from the positive line conductor through the interlocking switches "7-in" and "8-in," stop button 22, operating coil 27 and the lower contact members 29 of the transfer relay 24 to the negative line conductor. The electrical interlocks "7-in" and "8-in" are actuated by and close with the switches 7 and 8, in accordance with a familiar practice. A minimum voltage is now supplied from the main generator armature 1 to the winder motor armature 4 and also the armature 13 of the brake generator. The operator then releases the start button 21 and manipulates the generator field rheostat 14 to gradually increase the generator field excitation and correspondingly increase the speed of the winder motor to the desired value.

It is presumed that the current regulator 16 has been previously set for the desired tension. The rheostat 19 will of course be calibrated so that the operator may predetermine the tension and maintain it or vary it as desired. The regulator 16 is subject to the current traversing the brake generator and, consequently, will flutter or vibrate to maintain a certain effective field excitation of the brake generator. The tension established in the paper depends upon the value of current traversing the brake generator armature 13. In other words, the retarding effect of the brake generator varies in accordance with its load current and, therefore, by adjusting the operation of the regulator, this current may be maintained at any desired value.

The shunt operating coil 25 of the transfer relay 24 is normally energized by a circuit extending from the positive line conductor through inch button 23, start button 21 (in its illustrated upper position) and operating coil 25 to the negative line conductor. Therefore, the shunt operating coil 25 opposes the lower (series) holding-coil 26 and, if the paper should break, thereby reducing the load on the brake generator, the series coil becomes substantially de-energized and the shunt coil becomes effective to close the upper contact members 30 of the transfer relay 24 and open the lower contact members 29.

Thus the operating coil 27 of the line switch 8 is de-energized to interrupt the circuit of the winder motor armature and establish a dynamic-braking circuit, therefore, comprising the back-contact members 9 of the line switch and a braking resistor 31. The auxiliary switch 7 in the circuit of the motor armature is normally closed and a circuit for the operating coil 32 thereof extends through the inch button 23. Dynamic braking for the brake generator is thus simultaneously effected through resistor 31 immediately upon the closure of switch 9.

If at any time it is desired to stop the winding operation, this may be effected by depressing the stop button 22 to open the line switch 8, whereupon the previously described braking circuits are established. In order to effect momentary operations, commonly termed inching, the inch button 23 is depressed to momentarily energize the operating coil 27 of the line switch 8. This operating circuit for coil 27 also extends through the auxiliary button 28 on the generator field-rheostat 14, so that inching operations must necessarily be performed at a minimum speed.

Operation of the inch button 23 interrupts a circuit for the operating coil 32 of the auxiliary switch 7 and renders the winder motor ineffective, so that the inching operation is performed solely by the "brake" generator acting as a motor and receiving its energy from the main generator armature 1.

The dynamic-braking contact-members 9 of the line switch are normally closed by the action of gravity and, in addition thereto, a holding coil 33 is provided for insuring suitable and positive contact pressure. Coil 33 is connected to the line conductors through switch 30.

Various modifications of our invention will naturally occur to one skilled in the art. The brake generator may be operated from a friction roll adapted to engage the supply reel, for example, instead of being direct-connected in the manner described. We desire, therefore, that our invention shall be limited only in accordance with the scope of the appended claims.

We claim as our invention:

1. In a system for maintaining tension, the combination with a material supply reel and a winding roll, of a motor for operating the winding roll, a variable-voltage generator for controlling said motor, an auxiliary generator driven by said reel and means for connecting the auxiliary generator in parallel relation to said variable-voltage generator.

2. In a system for maintaining tension, the combination with a material supply reel and a winding roll, of a motor for operating the winding roll, a variable-voltage generator for controlling said motor, an auxiliary dynamo-electric machine operatively connected to said reel and means for selectively effecting the operation thereof as a motor or as a generator.

3. In a system for maintaining tension, the combination with a material supply reel and a winding roll, of a motor for operating the winding roll, a variable-voltage generator for controlling said motor, an auxiliary generator driven by said reel, means for connecting the auxiliary generator in parallel relation to said variable-voltage generator, and means for automatically regulating the current output of said auxiliary generator.

4. In a system for maintaining tension, the combination with a material supply reel and a winding roll, of a motor for operating the winding roll, a variable-voltage generator for controlling said motor, and electro-responsive braking means for controlling the reel to maintain tension on the material.

5. In a system for maintaining tension, the combination with a material supply reel and a winding roll, of a motor for operating the winding roll, a variable-voltage generator for controlling said motor, an auxiliary generator driven by said reel, and means for connecting the auxiliary generator to act as a drag on said reel.

6. In a system for maintaining tension, the combination with a material supply reel and a winding roll, of a motor for operating the winding roll, a variable-voltage generator for controlling said motor, electro-responsive braking means for controlling the reel to maintain tension on the material, and means for adjusting the braking effect.

7. In a system for maintaining tension, the combination with a material supply reel and a winding roll, of a motor for operating the winding roll, a variable-voltage generator for controlling said motor, an auxiliary generator driven by said reel, means for connecting the auxiliary generator in parallel relation to said variable-voltage generator, and automatically operable means for effecting dynamic braking of said motor and of said auxiliary generator.

8. In a system for maintaining tension, the combination with a material supply reel and a winding roll, of a motor for operating the winding roll, a variable-voltage generator for controlling said motor, an auxiliary dynamo-electric machine operatively connected to said reel, means for effecting the operation thereof as a motor or as a generator, and automatically operable means for effecting dynamic braking of said motor and of said machine under predetermined conditions.

9. In a system for maintaining tension, the combination with a material supply reel and a winding roll, of a motor for operating the winding roll, a variable-voltage generator for controlling said motor, an auxiliary generator driven by said reel, means for connecting the auxiliary generator in parallel relation to said variable-voltage generator, and means responsive to current traversing said auxiliary generator for controlling the operation of said motor.

10. In a system for maintaining tension, the combination with a material supply reel and a winding roll, of a motor for operating the winding roll, a variable-voltage generator for controlling said motor, an auxiliary generator driven by said reel, means for connecting the auxiliary generator in parallel relation to said variable-voltage generator, and means responsive to current traversing said auxiliary generator for controlling the operation of said motor and of said auxiliary generator.

11. In a system for maintaining tension, the combination with a material supply reel and a winding roll, of a motor for operating the winding roll, a variable-voltage generator for controlling said motor, an auxiliary dynamo-electric machine operatively connected to said reel, and automatically operable means for effecting dynamic braking of said motor and of said machine upon failure to maintain proper tension.

12. In a system for maintaining tension, the combination with a material supply reel and a winding roll, of a motor for operating the winding roll, a variable-voltage generator for controlling said motor, an auxiliary generator driven by said reel, means for connecting the auxiliary generator in parallel relation to said variable-voltage generator, a current regulator responsive to current traversing said auxiliary generator for controlling the field excitation of said auxiliary generator and electro-responsive means for varying the operation of said regulator.

In testimony whereof, we have hereunto subscribed our names this 24th day of June, 1925.

REESE T. KINTZING.
OSCAR C. CORDES.